United States Patent [19]
Cawley et al.

[11] 3,816,045
[45] June 11, 1974

[54] MOLD FORMING DEVICE

[76] Inventors: Leo P. Cawley; William A. Gurske; William L. Goodwin, all of P.O. Box 8152, Wichita, Kans. 67208

[22] Filed: June 26, 1972

[21] Appl. No.: 266,304

[52] U.S. Cl. .................. 425/175, 249/81, 249/119, 425/447, 425/450
[51] Int. Cl. .............................................. B29c 1/00
[58] Field of Search .......... 425/176, 178, 447, 448, 425/243, 253, 808, 180, DIG. 48, DIG. 44, DIG. 30, 450, 175; 249/81, 119; 264/219, 313, 319

[56] References Cited
UNITED STATES PATENTS

| | | | |
|---|---|---|---|
| 422,221 | 2/1890 | Joyne | 249/81 |
| 1,494,723 | 5/1924 | Tucker et al. | 264/219 |
| 2,513,785 | 7/1950 | Browne | 425/DIG. 44 |
| 2,532,501 | 12/1950 | Johnson | 425/808 X |
| 2,660,758 | 12/1953 | Hennike et al. | 425/178 |
| 2,714,226 | 8/1955 | Axelrod | 425/DIG. 44 |
| 2,991,600 | 7/1961 | Lancaster | 425/DIG. 48 |
| 3,070,846 | 1/1963 | Schrier | 425/447 |
| 3,297,422 | 1/1967 | Emerson et al. | 425/808 |
| 3,689,022 | 9/1972 | Rossetti | 425/447 X |

*Primary Examiner*—Robert L. Spicer, Jr.
*Attorney, Agent, or Firm*—John H. Widdowson

[57] ABSTRACT

A mold forming device has a first mold member with a portion of a side thereof to receive a layer of gel material. A second mold member is engagable with the first mold member, and has means to form a cavity with the side of the first mold portion, and means to fill the cavity when engaged. The mold forming device is constructed and adapted to form a layer of gel material.

10 Claims, 11 Drawing Figures

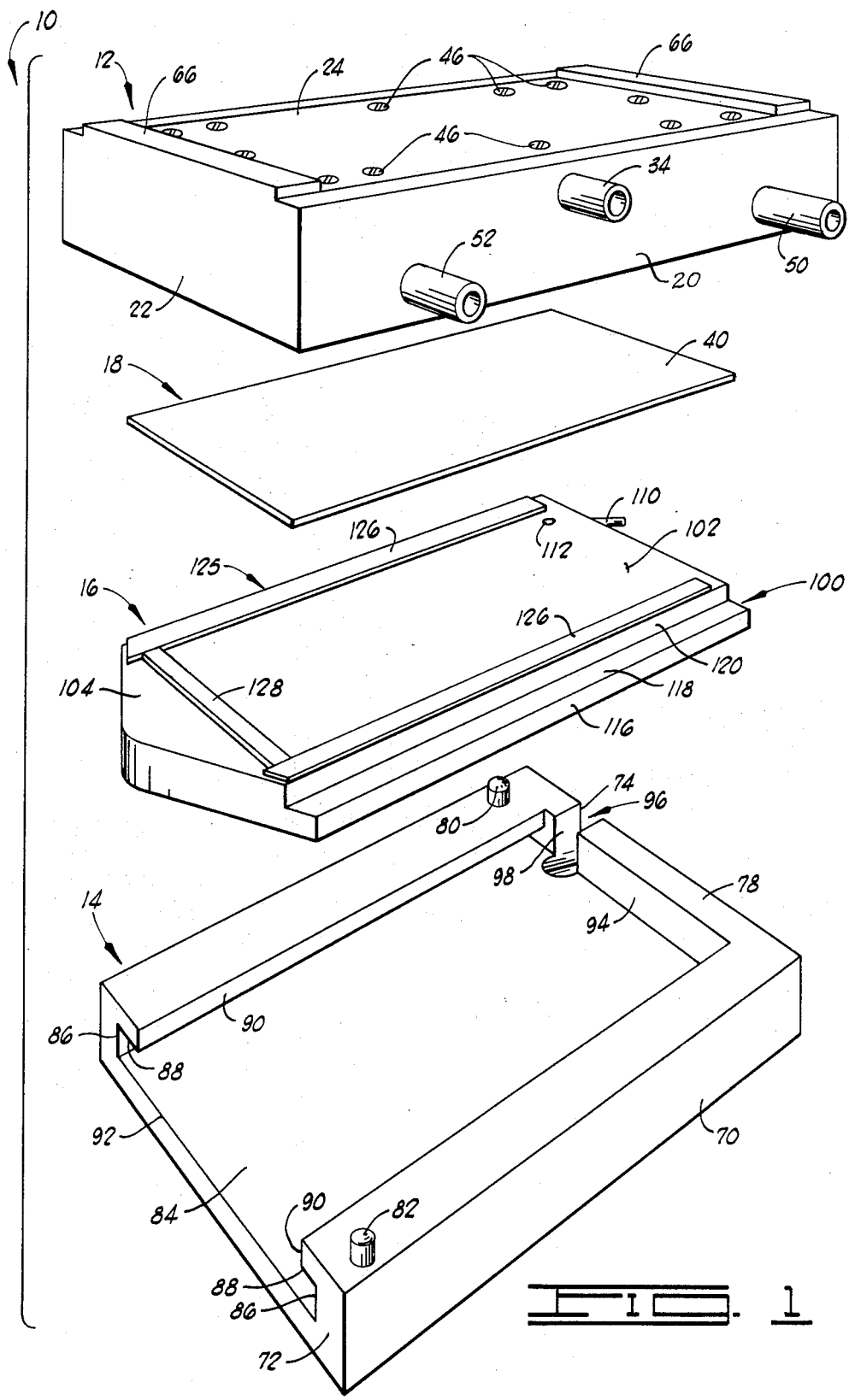

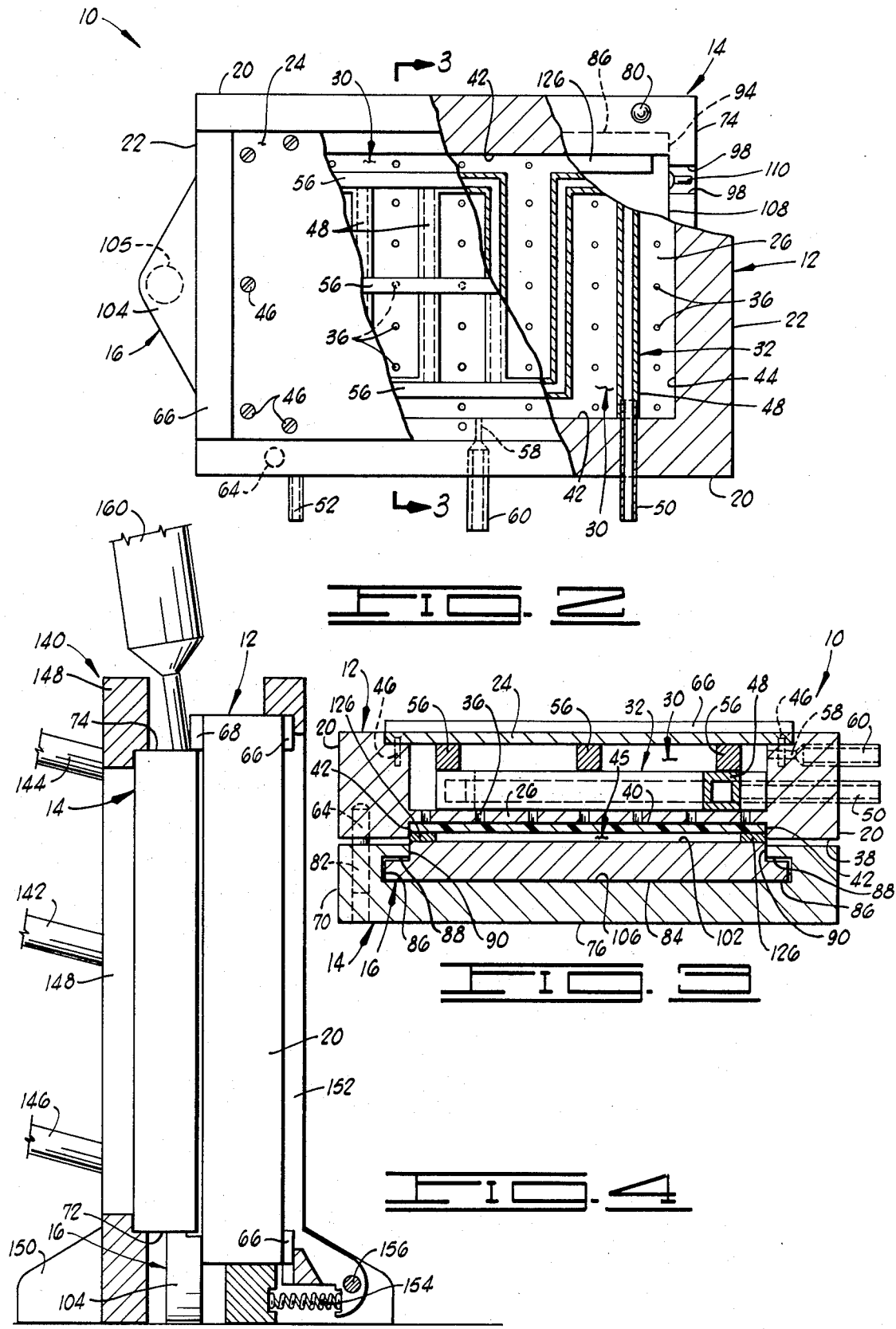

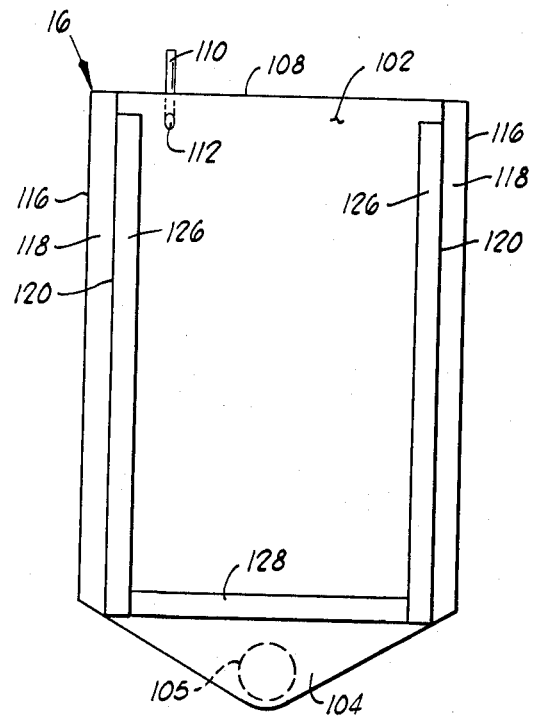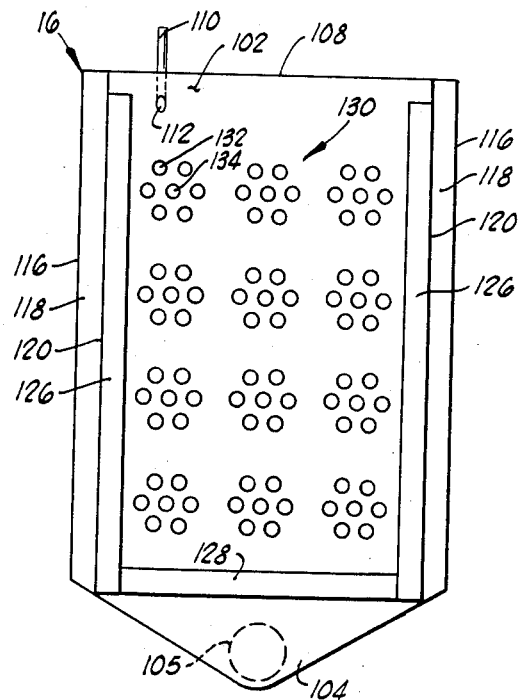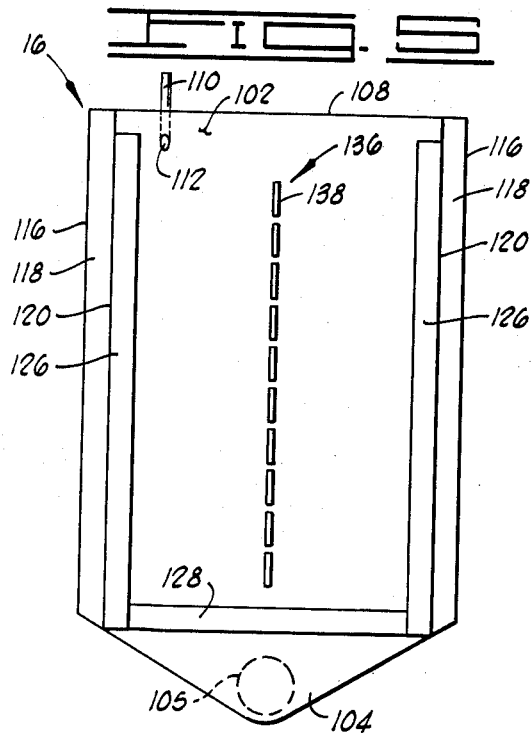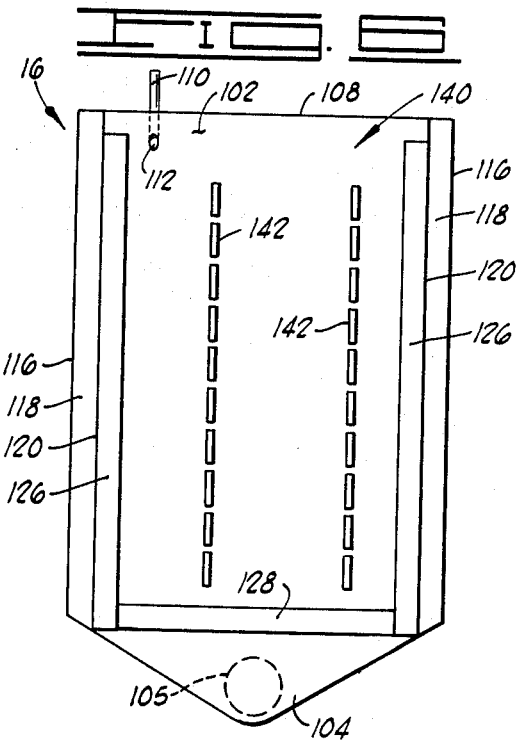

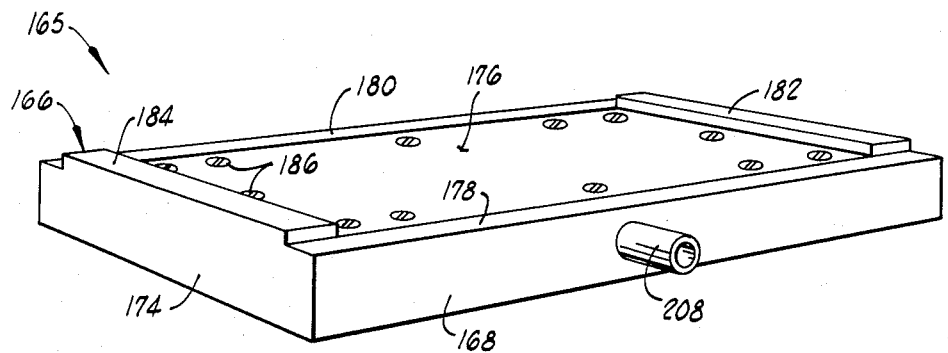
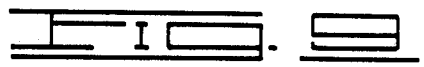
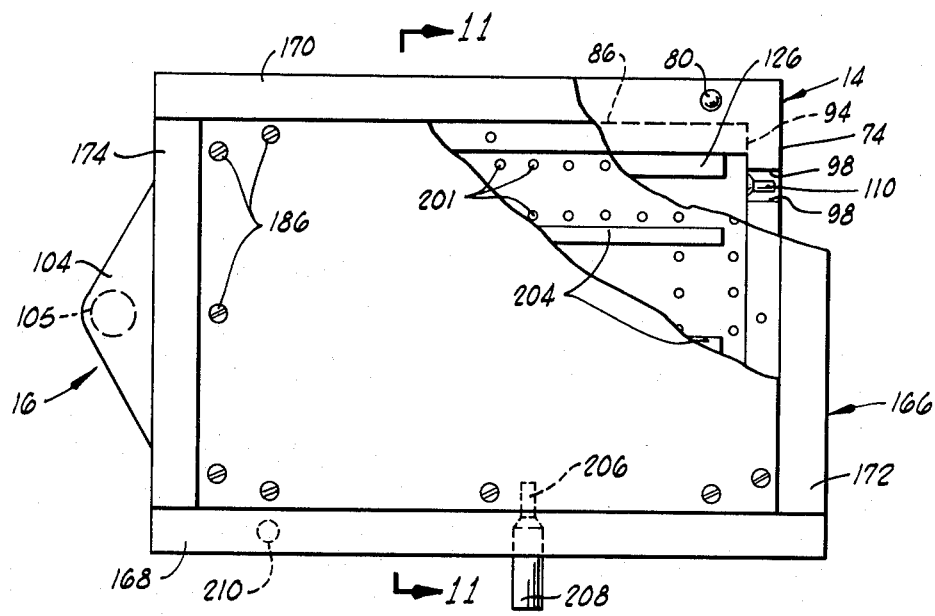
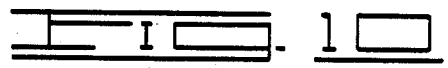
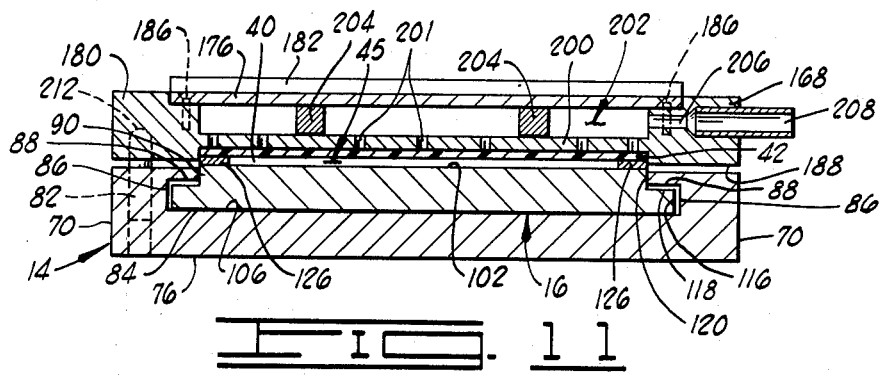
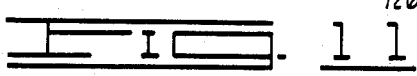

MOLD FORMING DEVICE

Numerous types of molding devices are known in the prior art as operable to mold material into desired shapes and to mold combinations of material into single structures which are themselves usable as molds. There are also several molding devices known in the prior art which are operable to mold a layer or film of one material onto the surface of another material. However, these prior art devices are not adapted for the particular production of a structure having a gel-like material molded onto a supporting sheet of material that produces a mold structure particularly adapted for use in biological testing. In the prior art no device is specifically known as being adapted for the molding of a layer of gel material on a supporting slide or sheet for biological testing and the production of a slide or specimen holding device for biological testing. In the prior art biological test slides having a layer of agar gel material on one side thereof are produced by several crude and inaccurate means. One means to produce the slides is to dip a slide into a vat of liquid agar gel material, thus coating the slide and producing a very thin layer of gel material on it. Another means of producing a coated slide is to pour liquid gel material onto the slide where it cools and solidifies, usually producing an uneven coating of gel material. Another means of producing gel coated slides is to place the slide in a tray-like container on the bottom then fill the tray with liquid gel, let it cool, then remove the slide. This tray molding means is slow and cumbersome as well as producing an uneven gel coating on the slides.

In one preferred specific embodiment of this invention, a mold forming device includes a structure having two mold members that cooperatively engage so as to enclose therebetween a sheet of supporting material to which agar gel material is molded when passed into the mold forming device to produce a mold-like slide for biological testing. The specific structure of the mold forming device of this invention includes a first mold member adapted to removably attach the supporting sheet on which the gel material is molded, and a second mold member with means to cooperatively engage the first mold member and having a forming means therewith to form a cavity adjacent the supporting sheet which is in operation adapted to form the gel material in the desired shape of the supporting sheet. The mold forming device is provided with means to hold the separate mold members together in operation and with means to fill the cavity produced therein the mold device when in operation. The first mold member of the invention is provided in two specific embodiments constructed and adapted to function similarly and accomplish the same result. One of the first mold members is provided with an apparatus to cool the mold forming device whereas the other is not provided with such. Both of the first mold members have a similar apparatus to removably receive and hold the gel supporting sheet of material.

One object of this invention is to provide a mold forming device overcoming the aforementioned disadvantages of the prior art devices.

Still, one other object of this invention is to provide a mold forming device having separable first and second mold members adapted to be cooperatively engaged and form a cavity therein and in operation having a sheet of gel supporting material therein so when the device is filled with gel material a layer of gel material is formed on the supporting sheet.

Still, another object of this invention is to provide the mold forming device which has a forming apparatus therein adapted to form a cavity between two separable portions of the mold device adapted to form a cavity in which liquified gel material is brought into contact with and solidified on a sheet of supporting material.

Still, one other object of this invention is to provide a mold forming device having two separable mold members one of which is provided with means to attach a sheet on which gel material is molded and hold same in contact therewith by means of vacuum pressure.

Still, another object of this invention is to provide a mold forming device which has two separable mold members adapted to form a layer of gel material on a supporting sheet, and one of the mold portions being provided with a manifold portion adapted to pass a heat absorbing fluid in operation to cool the mold forming device and the gel material and its supporting sheet.

Yet, another object of this invention is to provide a mold forming device having two cooperatively engagable mold members, one of which has a mold forming apparatus that is removable therefrom; the forming apparatus comprising that portion of the mold device which when in contact with the supporting sheet forms a cavity adjacent to the supporting sheet for the receipt of gel material to be molded on the sheet.

Yet, an additional object of this invention is to provide a mold forming device which has two separable mold members adapted in operation to form a layer of agar gel material on a transparent supporting sheet of plastic-like material, one of the mold members having means to removably attach the plastic material sheet by vacuum pressure and having an additional manifold apparatus adapted to cool the mold device and the gel material.

various other objects, advantages, and features of the invention will become apparent to those skilled in the art from the following discussion, taken in conjunction with the accompanying drawings in which:

FIG. 1 is an exploded perspective view of the mold forming device including the separable mold members, the removable forming member, and a sheet of transparent gel supporting material;

FIG. 2 is a plan view of the mold forming device having the first mold portion with the vacuum chamber apparatus and cooling apparatus, taken from the first mold portion side of the device and having three cut away portions, one portion exposing the vacuum chamber, the second portion exposing the cooling manifold portion, and the third exposing the mold cavity;

FIG. 3 is a sectional view of the mold forming device taken on line 3—3 of FIG. 2 and showing the device with the two mold members engaged and a sheet of transparent gel supporting material therein;

FIG. 4 is a side elevation view of the mold forming device supported in a clamp apparatus positioned with the cavity inlet upward, having the clamp apparatus shown in section for clarity;

FIG. 5 is a plan view of the removable mold forming member of the mold forming device having a planar surface which is adapted to produce a uniform layer of gel material on a transparent gel supporting sheet;

FIG. 6 is a plan view of the mold forming member of the mold forming device having a planar surface with a plurality of circular nipples extending therefrom adapted to form indentations in the formed gel material in the pattern shown;

FIG. 7 is a plan view of the mold forming member or tray of the mold forming device having a plurality of elongated rectangular nipples extending from the planar molding surface thereof, the nipples arranged in a straight line through the center portion of the mold forming member adapted to in operation form a plurality of elongated rectangular indentions into the layer of gel material formed by the mold forming device;

FIG. 8 is a plan view of the mold forming member of the mold forming device having a planar surface with a plurality of elongated and rectangular nipple portions extending therefrom adapted to in operation from a pair of rows of rectangular elongated indentions into the layer of gel material formed on the supporting sheet in the offset positions as shown;

FIG. 9 is a perspective view taken from the outer portion of a first mold member of the mold forming device having only a vacuum chamber apparatus therein;

FIG. 10 is a plan view of the mold forming device having the manifolded mold portion with the vacuum chamber therein, taken from the manifolded mold portion side, and having two cut away portions, the first portion exposing the vacuum chamber and apertures thereof, and the second portion exposing the mold cavity; and FIG. 11 is a sectional view of the mold forming device shown in FIG. 10 taken on line 11—11 of FIG. 10.

The following is a discussion and description of preferred specific embodiments of the mold forming device structure of this invention, such being made with reference to the drawings, whereupon the same reference numerals are used to indicate the same or similar parts and/or structure. It is to be understood that such discussion and description is not to unduly limit the scope of the invention.

Referring to the drawings in general and in particular to FIGS. 1, 2, 3, and 4, they show a preferred specific embodiment of the mold forming device of this invention, such being provided with means to cool the mold forming device and to hold the transparent gel supporting sheet therein with vacuum pressure. In the drawings FIGS. 5, 6, 7, and 8 show a plurality of mold forming members or molding trays usable with the mold forming device of this invention. Also, in the drawings FIGS. 9, 10, and 11 disclose a second preferred specific embodiment, 2, of the mold forming device of this invention, such being provided with means to hold the transparent gel supporting sheet therein in the proper position by means of vacuum pressure, and not having the particular cooling apparatus for the mold forming device as the first preferred specific embodiment, 1, but in all other respects similar.

Referring to the drawings in detail and in particular to FIG. 1, one preferred specific embodiment, 1, of the mold forming device of this invention is generally indicated at 10. The structure of this embodiment, 1, of the mold forming device includes a first mold member 12 and a second mold member 14 which has a removable forming member or tray 16 on which the gel supporting sheet 18 is placed when the mold forming device is in operation and which has means to form a cavity. The first mold member 12 is adapted in operation to be engaged with the second mold member 14, having the forming tray 16 in the second mold member 14, with the transparent sheet 18 adjacent thereto and held in its proper position on a side of the first mold member 12 by its vacuum holding apparatus. The cooling apparatus portion of the manifolded mold member 12 is adapted in operation to cool both the mold forming device and the gel material placed on the supporting sheet in the molding operation.

The first mold member 12 of the mold forming device 10 is a box-like structure having the compartment therein for the cooling apparatus and the vacuum pressure holding apparatus, and having a side adapted to receive thereon the sheet of transparent material 18. The first mold member 12 has elongated side walls 20 connected with end sidewalls 22, an outer side portion 24 and an inner side 26. The first mold member 12 is best seen in the combination of FIGS. 1, 2, and 3. The interior cavity of the manifold mold member 12 is between the two sides 24 and 26 and within the confines of the ends 22 and the elongated sides 20. The side 26 is the side which in operation supports the gel supporting sheet 18. The cavity can be considered as being separated into two portions: first a vaccum pressure portion indicated generally at 30 in FIG. 2 and comprising the open portion of the cavity, and second a cooling fluid manifold portion generally indicatd at 32 in FIG. 2 and consisting of a manifold passing through the cavity.

FIG. 2 and FIG. 3 show specific structural details of the first mold portion 12. Preferably, the end portions 22 and side portions 20 are integrally formed and have the sheet attaching side 26 connected therebetween spaced on the interior thereof. The sheet attaching side 26 has a plurality of apertures 36 therethrough preferably in the spaced rectangular pattern as shown. The spacing of the side 26 is such that it is slightly indented from the mating surface 38 of the sides 20 and ends 22 so as to form in cooperation with the second mold forming portion 14 the gel cavity 45 as shown in FIG. 3. The transparent gel supporting sheet is indicated at 40 in its proper position in the mold forming device 10 as it would be in operation of the device in FIG. 3. Preferably, the sheet 40 extends to the inner sides 42 and ends 44 of the first mold member 22. The vacuum cavity 30 is located on the opposite face of the sheet supporting side 26 from the face on which the sheet 40 is placed. The vacuum cavity is bounded by and sealed with the sides 20, ends 22, sides 24 and 26 which are all secured to each other. Preferably the side member 24 is held in place on the first mold member sides 20 and ends 22 by means of a plurality of screws 46 extending through its perimeter portion into the sides 20 and ends 22. The cooling manifold 32 is a rectangularly walled passageway through the vacuum cavity 30 and connected with the exterior of the first mold portion 12, thus adapted to pass a fluid through the compartment cavity in the presence of a vacuum atmosphere of the vacuum cavity 30. Specifically, the manifold 32 consists of rectangularly walled conduit 48 having a series of back-and-forth segments through the cavity as shown in FIG. 2, having an inlet conduit 50 and an outlet conduit 52 through the mold member side 20. In the upper portion of the vacuum cavity 30 above the rectangular conduit 48 are spacing members 56 positioned transverse to the back-and-forth segments of the cooling manifold 32. The spacers 56 are preferably three in number and positioned as shown in FIG. 2. The spacers 56 extend only above the manifold conduit 48 and do not extend to the mold member ends 22. The spacers 56 provide the vacuum cavity 30 with open communication between the void portions of the compartment cavity and more importantly the apertures 36 through the side member 26. The spacers 56 do not seal any portion of the compartment cavity; they provide structural support in stiffening the center portion of the first mold member 12. The vacuum cavity 30 has an outlet passageway 58 through the mold side 20 and a conduit 60 in the outer portion of the passageway 58 which in operation is connected to a source of vacuum pressure.

On the peripheral portions of the first mold member 12, a pair of indentations are provided on opposite corner portions thereof, one of which is indicated at 64 in FIG. 3 on the left-hand portion thereof, and another indicated at 64 in the lower portion of FIG. 2. These indentations 64 are adapted to receive lugs that extend from the second mold member 14 and in operation lock the first and second mold portions of the mold forming device together in their proper operating position. Additionally, on the peripheral portion of the first mold member the ends 22 are provided with raised ledges 66 on the opposite ends of the outer sides adjacent to the opposite ends of the side member 24; and an additional ledge portion 68 on the mating side 38 at one end portion as shown in FIG. 4. These ledges 66 and 68 are adapted to aid in securing the first and second mold members together and provide rests for the clamp apparatus used in holding the first and second mold members together.

The second mold member 14 supports the tray-like device or forming member 16 which is adapted to be engaged with the first mold member 12 thereby forming the mold cavity when in contact with the gel supporting sheet 18 and in operation engaged with the first mold member 12. The second mold member is essentially a block-like member having an open female recess therein substantially covering one side thereof and open to one end thereof. The second mold member has elongated sides 70, with one end 72 having the opening of the female recess, the opposite end 74 having a smaller opening, a solid side portion 76 forming the bottom of the recess and an opposite side 78 having the opening of the female recess. The female recess is adapted to cooperatively engage the forming member or tray 16. The opposite corners of the open side 78 have lugs 80 and 82 extending therefrom adapted to be engaged with the indentations 64 in corresponding corner portions of the first mold member 12. The open side 78 of the second mold member 14 is the mating side thereof and is adapted to adjacently face the mating side 38 of the first mold member 12 when the mold forming device is assembled.

The female recess has a flat interior surface 84, an upright end portion, inwardly extending ridge portions on the sides thereof joining the open side 78 to engage the forming member 16. The ridges as shown in the lower portion of FIG. 1 join the female recess flat side 84 on the outer elongated edges at an upright portion 86, have an inwardly extending lip portion 88 extending from the top of the upright portion and have an inner upright portion 90 on their innermost portion. The flat side portion 84 of the female recess is rectangular in form and extends from the mouth of the recess 92 to the opposite end thereof 94. At the end of the female recess opposite of the mouth end portion is the upright end wall 94 that has a passageway therethrough generally indicared at 96. The passageway 96 provides an opening for the cavity filler tube of the mold forming member or tray 16. When in operation the filler tube extends through the passageway 96 for filling of the mold cavity. The passageway 96 has its sides 98 open to the planar surface 84 of the female recess. As can be seen in FIG. 2 and FIG. 4, the second mold member 14 is significantly shorter than the first mold member 12; this is necessary in the shown construction so the ledge portion 68 on one end of the first mold member will contact the end 74 of the second mold member to aid in its stiffening and additional support.

A forming member or tray 16 is constructed so as to slide into the female recess of the second mold member 14 through the opening 92. The tray 16 has a seal to engage the gel supporting transparent sheet 18 so as to in operation hold the heated and liquid gel material within the gel cavity of the mold forming device 10. The forming member 16 is shown in perspective in FIG. 1 and in plan views in several embodiments thereof in FIGS. 5–8, and it is shown in the mold forming device in FIGS. 2, 3, 4, 10, and 11. Basically, the forming member 16 is a tray having formed side edge portions 100 to engage the ridged portions of the female recess, a molding side 102, and a filler tube. Specifically, the mold forming member 16 or tray is an elongated rectangular block-like member having one member 16 or tray is an elongated rectangular block-like member having one end portion thereof formed in a pointed and rounded shape thereby being adapted to extend from a second mold member when engaged therewith. Also, the tray 16 has a molding side 102, two elongated formed edge portions 100, a planar side 106 opposite the molding side 102, an upright end 108 opposite to the rounded and pointed end, a filler tube 110 extending from a filling passageway 112 communicating between the mold side 102 and the insert end 108. The elongated formed edges 100 have upright outer portions 116, inwardly extending ledge portions 118, and additional upright portions 120 connecting the ledges 118 with the molding surface 102. The elongated formed edges 100 are adapted to match and cooperatively engage with the indentations of the second mold member 14, with the upright portions 86 and 116 adjacent, the other portions 88 and 118 adjacent and the other upright portions 90 and 120 adjacent when the tray 16 is inserted in the female recess. When the tray 16 is fully inserted into the second mold member 14, the insert end 108 thereof is adjacent to the upright end 94 in the female recess. A seal generally indicated at 125 is provided around three sides of the molding surface 102 and consists of two elongated portions 126 and a transverse piece at the pointed and extended end portion 104 as shown clearly in FIG. 1. The seal 125 preferably consists of the three pieces 126 and 128 and is formed of a substantially flat resilient material, such as silicone rubber. Preferably the seal 125 is adhesively bonded to the mold forming member or tray 16. The seal 125 is adapted to be engaged with the peripheral portions of the gel supporting transparent sheet 18 during use of the mold forming device as can be seen in FIGS. 3 and 11.

FIG. 1 and FIG. 5 show the mold forming member 16 having a planar molding surface 102, and FIGS. 6, 7, and 8 show embodiments of the mold forming member having a plurality of nipples extending from the planar mold surface 102 which are adapted to form indentations in the gel material on the supporting sheet 18 when a slide is formed in the mold forming device 10. The plurality of nipples are preferably raised only slightly so as to make an indentation in the gel material of the produced slide without completely passing through the gel material to the gel supporting sheet. However, the nipples can be arranged, if so desired, to produce an aperture through the gel material into the supporting sheet 18. The nipples can be in singular or multiple guantity as desired by the user. The nipples consist of inert plugs, pins, or other appropriately shaped objects placed into apertures in the mold forming member sized to extend from the planar mold surface 102.

FIG. 6 shows the forming member 16 with a plurality of circular nipples arranged in a regular hexagonal pattern and having a seventh nipple in the center thereof. In this embodiment of the forming member 16, the hexagonal patterns are indicated generally at 130, the six outer nipples at 132, and the seventh center nipple at 134. As shown in FIG. 6 the hexagonal patterns of nipples 130 are arranged in symmetrical rows and columns, such in practice has been found an advantageous pattern to use in certain biological tests. FIG. 7 shows another embodiment of the mold forming member 16 with the nipples arranged in a single row of rectangular shaped nipples extending from the planar surface 102 aligning with the mold forming member in its lengthwise direction. The single row of nipples is indicated generally at 136, with the specific nipples indicated at 138. The nipples 138 are preferably rectangular in planform and elongated so as to produce an elongated and slotted rectangular aperture in the gel material molded on a finished slide. Positioning of the row of nipples 136 in the center portion of the mold tray 16 produces a row of apertures or slots in the gel material of a finished slide which in practice has been found advantageous in certain biological tests. FIG. 8 shows another embodiment of the mold forming member 16 with a pair of elongated rectangular shaped nipples, generally indicated at 140, extending from the planar surface of the mold forming member 16. The two rows of nipples 140 are somewhat similar to the single row of nipples 136 on the embodiment shown in FIG. 7. The two rows of elongated rectangular nipples 140 have the individual nipples indicated at 142. The rows 140 are preferably placed in an off-center position as shown in FIG. 8 wherein one row is closer to the edge seal member 126 than the other. The two rows of nipples 140 are adapted to produce two rows of elongated slotted apertures in the gel layer of a finished slide. In practice it has been found that slides produced with the dual rows of slotted apertures produced by the dual rows of nipples 140 are an advantage in forming certain types of biological tests.

FIG. 4 shows the mold forming device 10 operably mounted in a clamping apparatus, generally indicated at 140. In the clamping apparatus 140 the mold forming device 10 is in the engaged relation and positioned with the pointed and extended end portion 104 of the mold forming member 16 on the bottom thereof. In the operation condition flexible conduits are attached to the conduits 50, 52, and 60 as shown in the drawings. The center conduit 60 from the vacuum cavity 30 is connected to the conduit 142 that is connected to a vacuum pressure source; the other conduits 50 and 52 are connected to other conduits 144 and 146, respectively, which are connected to a source of heat absorbing fluid, such as water. In operation the water is used to cool the mold forming device and heated agar gel as it is placed in the mold.

The clamp apparatus 140 includes a stationary member portion 148 mounted on a base 150, a pivotal member 152 pivotally mounted with the base 150 and a spring 154 therebetween to force the pivotal member 152 toward the stationary member 148. The stationary clamp member 148 is rigidly secured to the base 150 and has indentations on the inner side thereof adapted to receive and hold the peripheral edge portions of the second mold portion 14. The pivotable clamping member 152 is pivotally mounted with the base 150 at a point indicated at 156 on the lower portion thereof; it has on its upper portion indentations to receive the peripheral edges of the first mold member 12. As shown in the drawings the clamping apparatus spring 154 acts on the clamping member 152 so as to rotate it toward the stationary clamping member 148. The clamping apparatus 140 shown and described herein is intended to illustrate by way of example one type of clamping apparatus which can be used to hold the separable members of the mold forming device together in a properly engaged position for use of the mold forming device. It is understood that the clamping apparatus 140 shown and described herein is intended to illustrate one clamping structure usable to hold the mold forming device of this invention in an operable position, and it is not intended to unduly limit the scope of the invention.

The preferred use and operation of the mold forming device of the first described preferred specific embodiment, 1, of this invention is described as follows: First, the mold forming device is prepared for use by separating the first and second mold members connecting the appropriate conduits to the first mold member 12. Next the gel supporting sheet 40 is placed on the first mold portion side 26 in the proper position. Then the vacuum source is connected to the vacuum cavity 30 to hold the sheet 40 in place on the surface of the side 26. Next, the first and second mold members 12 and 14 are engaged with the nold forming member 16 therebetween and the complete mold forming device 10 placed in the clamp apparatus 140 as shown in FIG. 4. The mold forming device is positioned in the clamp apparatus 140 with the extended and pointed end 104 of the mold forming member 16 downward so as to expose on the upper portion of the device the filler tube 110. Next, gel cavity 45 is filled by using the filler device 160. The filler device is preferably a syringe having an elongated needle. To fill the gel cavity 45 the syringe 160 is filled with heated liquid gel material, then the needle is passed through the filler tube 110 extending to the bottom of the gel cavity 45, whereupon the liquid gel material is forced from the syringe into the cavity, filling it from the bottom. In practice, filling of the gel cavity 45 from the bottom has been found to give the best results and eliminates the entrapment of air bubbles in the gel cavity as it is filled. As the gel cavity 45 is filled, the syringe 160 is raised with the rising fluid level and removed from the filler tube 110.

Once the gel cavity 45 is filled with the gel material, the cooling fluid is circulated through the manifold 32 to cool the mold and the gel material. Once the gel material has sufficiently cooled to be in a solidified gel-like state so that it can be removed from the mold forming device 10, the cooling fluid and vacuum pressure supplies are disconnected or shut off, and the clamping apparatus 140 is released so the mold forming device can be removed. With the vacuum pressure disconnected the second mold member 14 can be separated from the first mold member 12. When the mold parts are separated, the gel supporting sheet 40 stays on the mold forming member 16 with the molded gel material between the sheet 40 and the planar surface 102. With the mold portions having been separated, the gel supporting sheet can be easily peeled from the mold forming member 16 thereby freeing the finished product from the mold forming device. The finished product is molded gel material on the transparent supporting sheet 18. This molding operation can be easily repeated time and time again to produce agar gel slides for use in biological testing.

In a second preferred specific embodiment, (2), of the mold forming device of this invention, generally indicated at 165, and shown in FIGS. 9, 10, and 11 of the drawings, the device includes the same second mold member 14 and has a different first mold member, indicated at 166, having only a vacuum pressure apparatus similar to that shown and described in the first described preferred specific embodiment of the invention. This second embodiment first mold member 166 is constructed much like the first mold member 12 of the first described preferred specific embodiment only without the cooling apparatus portion of the structure. This vacuum manifolded first mold member 166 is a rectangular structure having elongated side members 168 and 170 with end members 172 and 174, an outer side member 176, outer elongated edge portions 178 and 180, and outer end ridged portions 182 and 184. The outer side portion 176 is secured to the peripheral edge portions 168, 170, 172, and 174 of the mold portion by screws 186 extending inward from the outside as visible in FIG. 9. The side opposite of the outer side 176 has a matching surface 188 on the opposite sides of the peripheral edge portions, and a sheet attaching side 200 extending therebetween the edge portions of the structure. The interior of this first mold member 166 defines a vacuum cavity 202 therebetween the sheet attaching side 200 and the outer side 176. The vacuum cavity 202 has a pair of elongated beams 204 extending therethrough adapted to give structural support to the side members 176 and 200, the beams extending substantially the length of the vacuum cavity 202 and terminating short of the end thereof so as not to restrict or seal any portion of the cavity from the vacuum pressure. An outlet passageway 206 connects the vacuum cavity 202 with a conduit 208 that extends from the mold member 166 through the side 168 adapted to provide fluid communication between a vacuum source and the vacuum cavity 202. Additional features of the second embodiment first mold member 166 are a pair of apertures in the side members 168 and 170, indicated at 210 and 212, respectively, which are to be engaged with pins 82 extending from the second mold member 14.

The first mold member 166 is adapted to be operated and used with the second mold member 14 in the same manner as the first described preferred specific embodiment, (1), of the mold forming device of this invention with the exception that cooling fluid is not used with this first mold portion. In the actual use and operation of the mold forming device of this second preferred specific embodiment, (2), it can be mounted with a clamp apparatus and filled with heated liquid agar gel material in the same manner as the first described embodiment; however, a longer period of time is necessary for the mold to set in order to allow the gel to cool than is required with the first described preferred specific embodiment of this invention. Once the agar gel material is cooled sufficiently to be properly set, the first mold member 166 is removed from the second mold member 14 after the vacuum pressure has been shut off and the vacuum pressure released from the vacuum cavity 202; at such time the gel supporting sheet 40 can be removed from the mold forming member or tray 16 for removal of the finished slide from the mold forming device with the layer of gel material attached thereto. This preferred specific embodiment, 2, has an advantage of being less bulky than the first described preferred specific embodiment, 1, and not requiring the auxiliary apparatus to pass a cooling fluid through the device; however, it cannot be used in as rapid a repetitive operation as the first described preferred specific embodiment due to the lack of the cooling facility.

In the manufacture of the mold forming devices of the herein described two preferred specific embodiments of this invention, it is obvious that the mold structure, and including the various replaceable components thereof, can be easily and durably constructed of plastic-like material in order to achieve the end product. The use of a transparent plastic-like material in the manufacture of the herein described invention and the various components thereof in practice has been found to be advantageous due to the thermal conductivity of plastic material and its inherent inertness relative to the agar gel material, and such material is preferred. The first mold member of both of the preferred specific embodiments can be constructed so as to be usable with either second mold member of the second described preferred specific embodiment so as to provide for easy and rapid replacement of the mold forming members. Likewise, the mold forming members can be constructed to be interchangeable between the second mold members of the two separate embodiments and constructed to form a plurality of patterns in the gel material as it is molded.

In the use and operation of the mold forming device of this invention, it is seen that same provides a simple and easily reusable structure for the production of biological test slides having a layer of agar gel material molded onto the transparent supporting sheet. In the use of the first described preferred specific embodiment, 1, it is provided with means to rapidly cool the mold forming device structure and the heated agar gel material which is placed within the gel cavity of the device and in the end product. In the use of both the first and second preferred specific embodiments of this invention, both are provided with a vacuum pressure means to hold the transparent sheet of material securely in cotact therewith during the molding operation so as to produce a molded layer of agar gel on a supporting sheet. Additionally, in the second preferred specific embodiment of this invention, same is provided with only a vacuum pressure means to attach the gel supporting sheet thereto during the molding operation. In each of the herein described preferred specific embodiments of this invention, each is usable with a similarly constructed second mold portion which is adapted for the removal of the forming member or tray to provide replacement of the tray with other trays having means to form various indentations in the gel coating that is applied to the supporting slide sheet.

As will become apparent from the foregoing description of the applicant's mold forming device, relatively inexpensive and simple-to-operate means have been provided to form biological slides with a layer of agar gel material molded onto one side of a supporting sheet. The mold forming device is relatively economical to manufacture, simple to use, and can be repetitively operated to produce a quantity of the finished product slides or molds. Additionally, the mold forming device has the capability of producing through the use of additional forming members or trays slides having various patterns of indentations in the mold surface thereof and/or apertures through the gel to the gel supporting sheet of the slide in accordance with the desires of the user. The mold forming device has the advantage of being able to repetitively produce biological slides having a layer of gel material molded thereon and which are uniform in nature and which can be produced relatively rapidly.

We claim:

1. A mold forming device to form a layer of gel material comprising a first mold member including a structure defining a first cavity, a first inlet into said cavity, and a plurality of apertures in communication with said first cavity, a gel supporting sheet positioned contiguous to said apertures, a means for creating a vacuum within said cavity to removably engage said sheet while being contiguous to said apertures, said vacuum creating means being connected to said first inlet, a tray member having a second inlet, a means for sealing attached to said tray and supporting the surface of said sheet such as to form a second cavity delineated by said means for sealing and the surface of said sheet and of said tray member, said second inlet being in communication with said second cavity, and means for injecting said gel material through said second inlet and into said second cavity.

2. The mold forming device of claim 1 additionally including a means for cooling said sheet and said gel material, and said means for cooling being attached to said first mold member.

3. The mold forming device of claim 2 wherein said means for cooling is situated within said first cavity.

4. The mold forming device of claim 3 wherein said first mold member additionally includes a third inlet and a first outlet, said third inlet and said first outlet being in communication with said first cavity, and said means for cooling comprises a manifold cavity connected to said third inlet and to said first outlet, and a heat absorbing fluid circulated through said third inlet, said manifold cavity, and said first outlet, in order stated.

5. The mold forming device of claim 1 additionally including a means for securing said tray member to said first mold member.

6. The mold forming device of claim 4 additionally including a base member, said base member including a recess wherein said tray member slidably lodges, and a plurality of lugs attached to said base member for engaging said first mold member.

7. The mold forming device of claim 1 wherein said surface of said tray which delineates a portion of said second cavity additionally includes a multiplicity of protrusions bound thereto and extending therefrom to form a multiplicity of indentations in the layer of said gel material.

8. The mold forming device of claim 5 wherein said first cavity additionally includes a plurality of support beams lodged therein.

9. The mold forming device of claim 8 wherein said first mold member additionally comprises a recess, a lid removably attached thereto to define a boundary of said first cavity, said structure of said first mold member additionally being essentially rectangularly box-like, said recess including said sheet lodging therein when said sheet is contiguous to said apertures and removably engaged by said means for creating a vacuum, and said means for sealing comprises a pair of elongated gasket members positioned in proximity to the perimeter of said surface of said tray which forms a boundary for said second cavity, and a transverse gasket member situated such that said pair of elongated gasket members and said transverse gasket member form a substantially U-shape, and said mold forming device additionally comprises a rectangular bottom portion, a pair of upright sides connected to said bottom portion, a pair of rectangular ledges integrally bound to the tops of said upright sides, and an end wall attached to said bottom portion to said upright sides and to said rectangular ledges such as to form a recess wherein said tray member is slidably housed, and a plurality of lugs connected to said upright sides to engage with said first mold member.

10. The mold forming device of claim 9 additionally including a clamp apparatus for engaging same which comprises a base, a stationary member connected to said base, a pivotal member pivotally mounted to said base, and a means for biasing said pivotal member towards said stationary member to hold said mold forming device therebetween, said means for biasing being connected to said base and to said pivotal member.

* * * * *